June 2, 1970  KAZUMA ADACHI  3,514,974
NOISE PREVENTION DEVICE IN TORSIONAL VIBRATION
Filed May 22, 1968  3 Sheets-Sheet 1
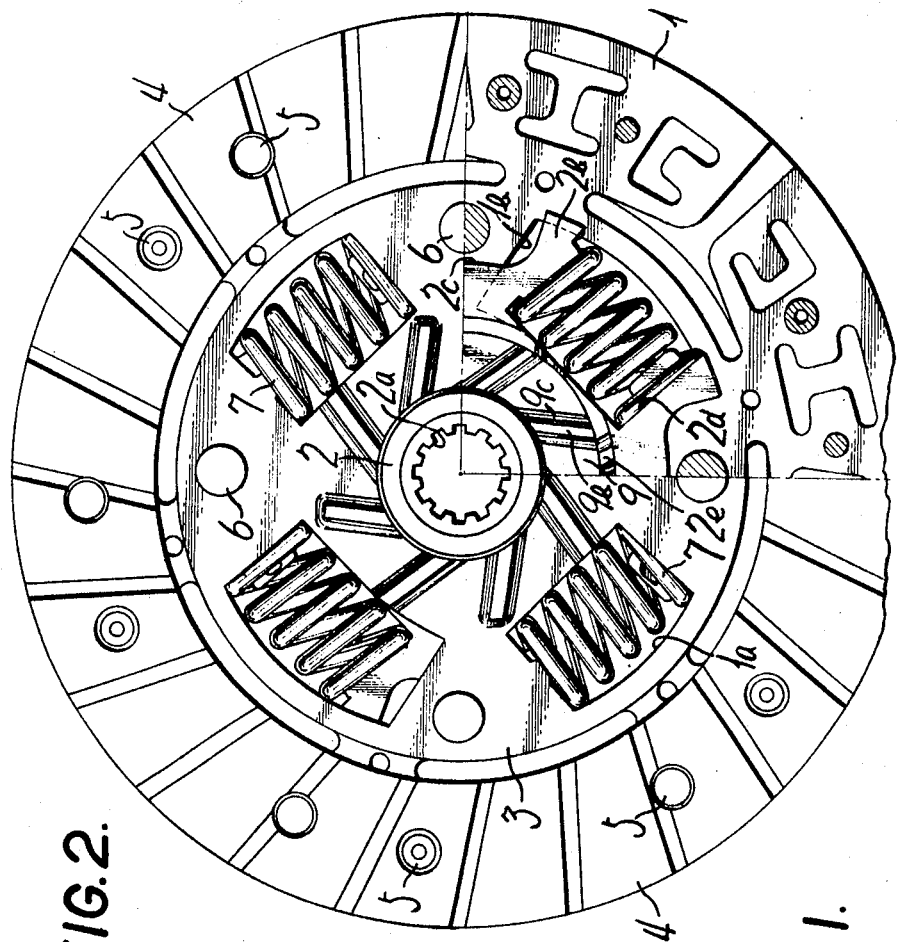
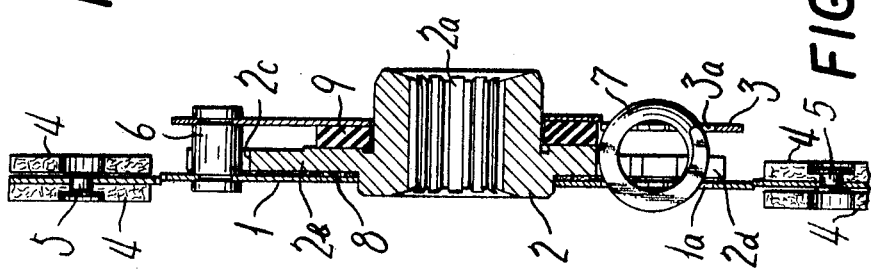
KAZUMA ADACHI,
*Inventor*
By Wenderoth, Lind
and Ponack.  *Attorneys*

June 2, 1970   KAZUMA ADACHI   3,514,974
NOISE PREVENTION DEVICE IN TORSIONAL VIBRATION
Filed May 22, 1968   3 Sheets-Sheet 2
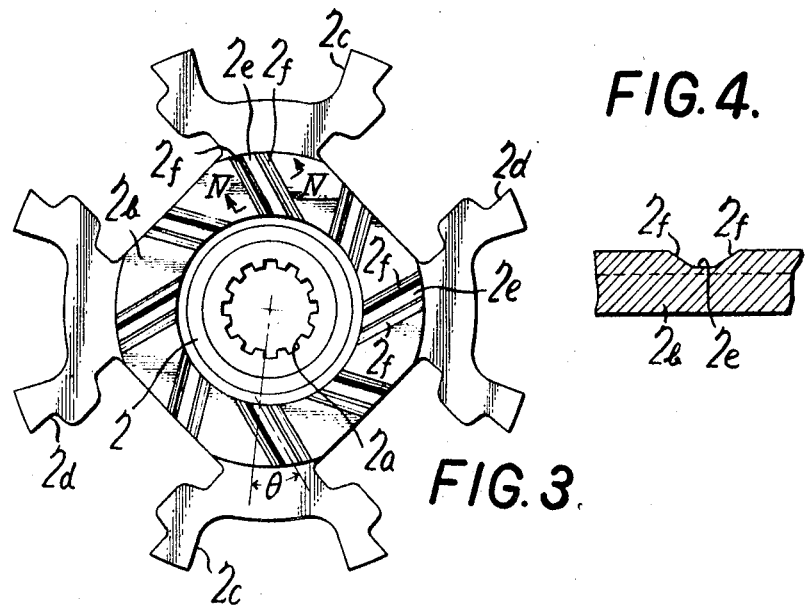
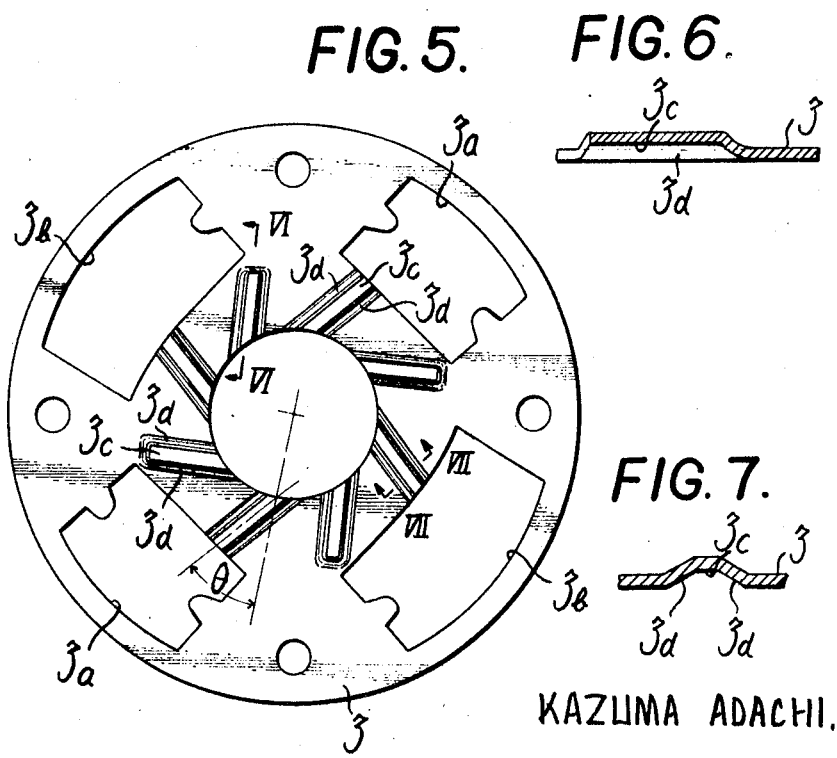
KAZUMA ADACHI,
Inventor June 2, 1970  KAZUMA ADACHI  3,514,974

NOISE PREVENTION DEVICE IN TORSIONAL VIBRATION

Filed May 22, 1968  3 Sheets-Sheet 3

KAZUMA ADACHI,
*Inventor*

By Wenderoth Lind
and Ponack  *Attorneys*

United States Patent Office 3,514,974
Patented June 2, 1970

3,514,974
NOISE PREVENTION DEVICE IN TORSIONAL VIBRATION
Kazuma Adachi, Osaka, Japan, assignor to Kabushiki Kaisha Daikin Seisakusho, Osaka, Japan
Filed May 22, 1968, Ser. No. 731,074
Claims priority, application Japan, June 10, 1967, 42/37,246
Int. Cl. F16d 3/12
U.S. Cl. 64—27                                    4 Claims

ABSTRACT OF THE DISCLOSURE

This invention relates to the prevention of noises invariably produced in a relative relation between driving shafts and driven shafts, for instance in power transmitting means such as a clutch disc, by disposing a wearproof rubberlike elastic material of special geometry between driving members driven by engine and members driven by rotation transmitted therefrom on the peripheries of the hubs of said members.

---

This invention relates to a device for effectively preventing noises produced by torsional vibration caused by changes in an angle of torsion during transmission of power by structural members related with a drive mechanism in power transmitting means which are subjected to the effect of elasticity inherent in the structural members in automotive vehicles such as for example a clutch disc for the automobile.

Among such noises as produced by the automotive vehicles those produced by a power transmission shaft system i.e. structural members related with a drive mechanism have a frequency factor that sharply irritates the driver, and particularly when resonance is produced at a certain number of revolutions, they give so much trouble to the driver as to make it impossible to start a vehicle, to say nothing of making a smooth start.

Furthermore, the noises of the character described have many factors to be ascribable to the vibration and accordingly great difficulties are involved in the preventive measures against the noises. On the other hand, there has been recently in the design of vehicles a growing tendency to make the vehicles lighter in weight, and accordingly a unitized body structure is employed to which structure vibrations and noises are more readily transmitted and various structural members also are designed so as to be reduced in size and weight. This structural tendency reduces the inertia mass of a body of revolution such as a propeller shaft, with the result that the tooth tops of gears float in backlash in a state of running under very light load or of shifting from acceleration to coasting thereby tending to produce increased vibrations to give shocks to the gears meshing with each other and causing noises.

In order to eradicate the disadvantages described above, members related with torsional vibration such as a conventional type of clutch disc for use in the automobile are provided with a friction damper adapted to absorb the vibrations and shocks of the character described by the action of friction force, said clutch disc absorbing unnecessary energy of vibration through the friction of a friction damper by slightly increasing a difference in positive and negative directions of hysterisis characteristic with which are related torsional torque of the clutch disc twisted while the clutch disc is transmitting power and the angle of torsion of the clutch disc and thus controlling the volume of noise to the smallest possible degree. But the measures of the character thus taken cannot change a tendency of the hysterisis characteristic curve to describe a linear locus, and cannot completely remove from said structural members related with a drive mechanism the number of vibrations peculiar to the structural members which vibrations produce resonance at a certain number of revolutions of the structural members, but leave a basic factor in the produced vibrations and noises unremoved.

An object of this invention is to remove the disadvantages of the described character peculiar to the device in conventional use and to eliminate the basic causes of the vibrations and noises produced.

Another object of this invention is to provide a device that can remove the causes of vibration and noise in response to changes ranging over a very wide area such as for example running speed, a state of running of the automobile, etc.

Another object of the invention is to provide a noise prevention device of the character described wherein the durability of a wear-proof material such as rubber which is fitted for removal of the causes of vibration and noise is remarkably improved and the deterioration of the material is prevented over a long period of time.

Still another object of the invention is to provide a noise prevention device of the type adapted for mass production by simplifying the structure of said improved noise prevention device and removing difficulties encountered with production.

The objects described above in the application of the invention to a clutch disc for use in automobiles are attained by interposing an elastic ring body made of wearproof elastic material such as rubber or similar substance formed into a special geometry (for example, synthetic resin elastic body) between a clutch plate or a retaining plate which constitutes a power transmission member in the clutch disc and a spline hub which constitutes a driven member and by giving the construction suitable for the ring body to the power transmission member and the driven member. It will be apparent from the description to be presently made that this invention can be modified and applied to various power transmission mechanisms with which the clutch disc of the construction to be described hereinafter and various types of clutch discs and torsional vibration relate without departing from the scope and spirit of the invention.

A detailed description will be made below of one form of the invention applied to the clutch disc for use in the automobile with reference to the accompanying drawings in which:

FIG. 1 is a longitudinal sectional view of a clutch disc according to this invention;

FIG. 2 is a side view of FIG. 1, showing a retaining plate broken in part;

FIG. 3 is a side view of a spline hub detached from the clutch disc;

FIG. 4 is a longitudinal sectional view taken along line IV—IV of FIG. 3;

FIG. 5 is a side view of a retaining plate detached from the clutch disc;

FIGS. 6 and 7 are respectively sectional views taken along lines VI—VI and VII—VII of FIG. 5;

Figure 8:
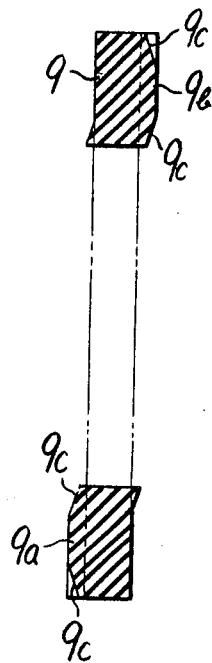
FIG. 8 is a longitudinal sectional view of an elastic ring body formed of wear-proof elastic material such as for example rubber.

Referring now to the drawings, a clutch disc as is well known comprises a clutch plate 1, main parts of spline hub 2 and retaining plate 3, and various drive members to be hereinafter described. The clutch plate 1 has a friction facing 4 integrally mounted by use of rivets 5 to both sides thereof, said friction facing being positioned midway between a flywheel of a prime mover not shown and a pressure plate and being adapted to bring itself into frictional contact with the flywheel and the pressure plate by the pressure applied to the pressure plate and to transmit torque to the clutch disc by the friction force produced by said frictional contact. The inside hole of the clutch plate 1 is rotatably fitted over the outer diameter of the boss portion of a spline hub 2. The spline hub 2 has a spline 2a provided in the inside hole thereof, said spline 2a being adapted to transmit torque by spline-fitting the main shaft of a speed change gear not shown into said inside hole of the spline hub 2, said spline 2a having a flange 2b on the outer diameter portion as the shape of the flange 2b is in detail shown in FIG. 3, said clutch plate 1 being positioned on the side of the flange 2b so as to fit over the boss portion. Over the boss portion on the other side of said flange 2b is rotatably fitted the inside hole of the retaining plate 3, and accordingly the flange 2b of the spline hub 2 is positioned midway between the clutch plate 1 and the retaining plate 3. On the outer peripheral portion of the flange 2b are formed a suitable number of arcuate notches 2c which have space rivets 6 positioned therein, which space rivets 6 combine the clutch plate 1 integrally with the retaining plate 3 and said space rivets 6 are allowed to move circumferentially in the arcuate notches 2b so as to allow a combination of the clutch plate 1 and the retaining plate 3 and the spline hub 2 to move in a direction of rotation with respect to each other within a suitable range. In the flange 2b of spline hub 2 are formed notches 2d into which are engagedly inserted torsion springs 7 that exert repulsive force in a direction of rotation and in which the torsion springs 7 are held, and also in the clutch plate 1 and the retaining plate 3 are respectively formed windows 1a, 3a, 1b and 3b corresponding to the notches 2d of said flange 2b. The torsion springs 7 held at both ends on the notches 2d of said flange 2b are caused to exert their elasticity on the clutch plate 1 and the retaining plate 3 through the windows 1a, 3a, 1b and 3b, thereby causing a buffer action to be effected in the direction of rotation between a combination of the clutch plate 1 and retaining plate 3 and the spline hub 2. Additionally, between the clutch plate 1 and the flange 2b of spline hub 2 is interposed a friction washer 8 of wear-proof elastic material as shown in FIG. 1, and friction is produced between the clutch plate 1 and the spline hub 2 in conjunction with an action to be presently described. That is to say, a clutch disc of a general type used in the automobile is designed to make the torsion springs 7 absorb and dampen a sudden change in torque and to make friction torque absorb torsional vibration, which friction torque is produced through a friction washer 8 between the clutch plate 1 and the spline hub 2, but this kind of means alone is not sufficient to attain the object of completely preventing the production of noises caused by torsional vibration.

Figure 9:
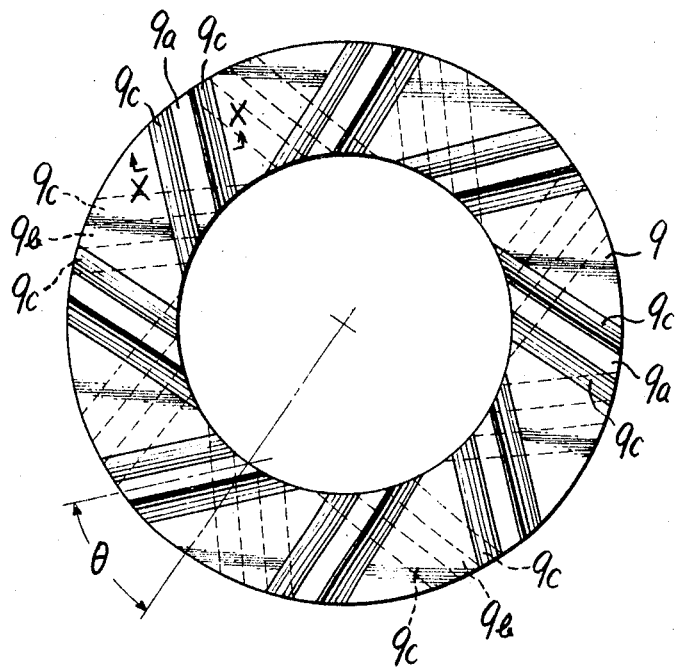
FIG. 9 is a side view of the elastic ring body of FIG. 8.
Figure 10:
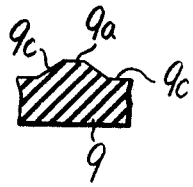
FIG. 10 is a sectional view taken along line X—X of FIG. 9.

In this invention a further step is taken which comprises interposing an elastic ring body 9 formed of wearproof elastic material such as rubber or other similar material between the aforesaid retaining plate 3 and the flange 2b of spline hub 2. The elastic ring 9, as shown by way of example in FIGS. 8, 9 and 10, has a suitable number of protrusions 9a and 9b formed and extending substantially radially on both side faces thereof, and forms those faces of the protrusions 9a and 9b which face toward the direction of rotation into inclined surfaces 9c. On that surface on which the flange 2b of spline hub 2 is in contact with said elastic ring 9 are formed grooves 2e for fitting said protrusions 9a and having the same sectional profile as the protrusions 9a, and on that surface on which the retaining plate 3 is in contact with the elastic ring 9 are formed grooves 3c for receiving the protrusions 9b of the elastic ring 9 therein and having the same sectional profile as the protrusions 9b in the same manner as in the case of the flange 2b of spline hub 2. The protrusions 9a and 9b of the elastic ring 9 are engagedly inserted into the grooves 2e and 3c, respectively and the elastic ring 9 is pressed in a sandwiching manner and interposed between the retaining plate 3 and the flange 2b of spline hub 2. Each of the protrusions 9a and 9b of the elastic ring 9 shown in FIG. 9 is inclined at a suitable angle $\theta$ with respect to a radial direction but this inclination is determined suitably in consideration of the transmission torque of the clutch disc or the state of use of the clutch disc.

Figure 11:
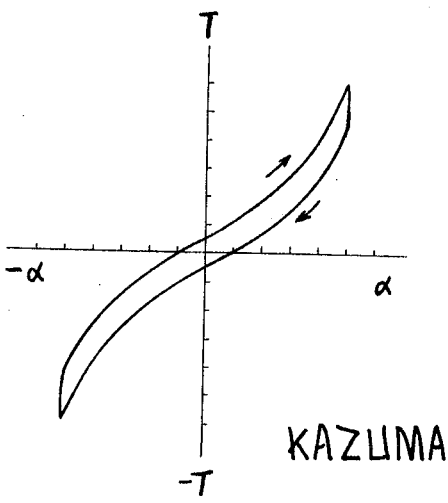
FIG. 11 is a hysterisis characteristic curve in the drive of the clutch disc for automobile according to the invention in which curve T represents torsional torque and α represents an angle of torsion.

When the elastic ring 9 is interposed in the described manner of construction between the retaining plate 3 of clutch disc and the flange 2b of spline hub 2, and when a torsional effect works between a combination of the clutch plate 1 and retaining plate 3 and the spline hub 2, namely the torsional torque that gives rise to a position lag in the direction of rotation of said combination of clutch plate 1 and retaining plate 3 and said spline hub 2 works between the combination and the spline hub 2 during driving of the clutch disc i.e. the transmission of torque, the elastic ring 9 is twisted between the retaining plate 3 and the spline hub 2, and furthermore, the inclined surfaces 9c of the protrusions 9a and 9b of the elastic ring 9 which inclined surfaces 9c face toward the direction of rotation are pressed onto the inclined surfaces 2f and 3d respectively of the grooves 2e on the side of the flange 2b of spline hub 2 and of the grooves 3c of the retaining plate 3, with the result that a force to cause the protrusions 9a and 9b to slip out of place from the grooves 2e and 3c is produced to bring about a camming effect for expanding the space between hte retaining plate 3 and the flange 2b of spline hub 2 and the elastic ring 9 resists said torsional effect and camming effect because of the visco-elasticity peculiar to the material forming the ring 9. The friction washer 8 is pressed onto the flange 2b of spline hub 2 and the clutch plate 1 by a combination of those effects whereby friction torque is produced. The friction torque thus produced and the visco-elasticity of the elastic ring 9 contribute greatly toward a damping effect that absorbs vibrations and noises. Because of the fact that a wear-proof elastic material, such as rubber, which constitutes the elastic ring 9 is not only great in loss of energy within the material that resists the torsional effect but also has a visco-elasticity effect and because of the fact that the camming effect as described is carried out between the protrusions 9a and 9b and the grooves 2e and 3c, the entire damper torque is increased in proportion to the angle of torsion of the clutch disc and a nonlinear hysterisis effect is obtained in a relation of the angle of torsion $\alpha$ with torsional torque T as shown in FIG. 11. Accordingly, because a spring constant is great during high torque and small during low torque, the allowable torque of a power transmission means such as clutch disc can be made great and the prevention effect of vibration and noise during low torque is great.

The spring constant in a negative direction can be made smaller than in a positive direction by fixing the inclination of the protrusions 9a and 9b of the elastic ring 9, namely the angle of inclination $\theta$ with respect to a radial direction, and accordingly the preventability of vibration in time of shifting from acceleration to coasting or during coasting and low torque running can be improved. Additionally, as a vibration damping effect during low torque is carried out by the visco-elasticity of the elastic ring 9 itself, noises due to backlash of gears related with the drive mechanism can be prevented. Also because the elastic ring 9 is used not as a friction material but as an elastic material in which the torsional rigidity of the material itself is utilized, the durability of the elastic ring 9 also is greatly improved.

The structure of the invention absorbs torsional vibration and shock in a highly effective manner, and thus can remove varied causes for producing noises. Furthermore, the invention is simplified in structure, offering no difficulty in manufacture, and being fit for mass production.

What is claimed is:

1. In a torsion power transfer system having a driving member including a clutch plate and a retaining plate having a first opposed surface, a driven member including a spline hub having a second opposed surface, torsion springs located between said driving member and said driven member to dampen a sudden change in torque in said system, and a friction washer disposed between said clutch plate and said spline hub to absorb torsional vibration in said system, a noise prevention means for further preventing noise created by torsional vibration in said system; said noise prevention means comprising an elastic ring of wear-proof material having parallel side surfaces and disposed between said opposed surfaces and means to press said side surfaces into contact with said opposed surfaces.

2. In the torsion power transfer system of claim 1, said elastic ring having a plurality of protrusions extending substantially radially along each of said side surfaces, and said opposed surfaces each having a plurality of grooves, each of said grooves engagingly receiving one of said protrusions.

3. In the torsion power transfer system of claim 2, each of said grooves and said protrusions having inclined surfaces, whereby in response to torsion in said system said inclined surfaces of said grooves act with said inclined surfaces of said protrusions to create a camming action to force said opposed surfaces apart.

4. In the torsion power transfer system of claim 3, each of said protrusions and said grooves extending at a fixed angle with respect to a radial direction, said fixed angle functioning to make a spring constant in a negative direction smaller than that in a positive direction during transmission of torque by said system.

References Cited

UNITED STATES PATENTS

| | | | |
|---|---|---|---|
| 1,760,619 | 5/1930 | Woolson | 192—106.1 |
| 1,984,578 | 12/1934 | Griswold | 192—106.1 |
| 2,014,362 | 9/1935 | Tatter | 192—106.1 |
| 3,327,820 | 5/1967 | Maurice. | |
| 3,428,155 | 2/1969 | Binder et al. | |

ROBERT A. O'LEARY, Primary Examiner

W. S. RATLIFF, Jr., Assistant Examiner

U.S. Cl. X.R.

74—574